H. O. BOYER.
LUBRICATOR.
APPLICATION FILED NOV. 26, 1919.
1,375,648.
Patented Apr. 19, 1921.
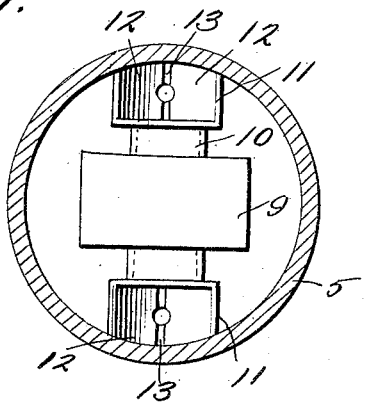
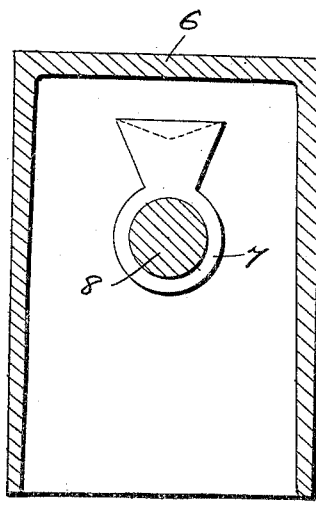
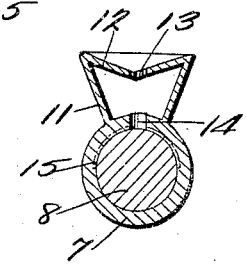
Harry O. Boyer, Inventor

UNITED STATES PATENT OFFICE.

HARRY O. BOYER, OF PROBERTA, CALIFORNIA.

LUBRICATOR.

1,375,648.    Specification of Letters Patent.    Patented Apr. 19, 1921.

Application filed November 26, 1919. Serial No. 340,910.

*To all whom it may concern:*

Be it known that I, HARRY O. BOYER, a citizen of the United States, residing at Proberta, in the county of Tehama and State of California, have invented certain new and useful Improvements in Lubricators, of which the following is a specification.

My invention relates to lubricators for piston rods and more particularly to means for lubricating that element which joins the connecting rod with the piston.

The primary object of the invention lies in the provision of a device as mentioned above, including means for retaining the oil within the reservoir which is supplied thereto by the splash system.

Another object of the invention lies in constructing the device in such a manner that the oil will be freely distributed, thus assuring proper lubrication of the parts with which it is used.

A further object of the invention lies in the provision of a lubricating device that is highly efficient in accomplishing its purpose, simple in construction, and inexpensive to manufacture.

Briefly stated, it is a well known fact that the cross-head pin which joins the connecting rod with the piston of an internal combustion engine must be journaled very tightly in its bearings and owing to the intense heat of these bearings there is consequently considerable wear on the pin which eventually causes the engine to pound. In order to overcome this difficulty I attach to the bearings or connecting rod, as the case may be, lubricant reservoirs having means for retaining oil which is supplied thereto by the splash system. The bottom of the reservoir is apertured and branching therefrom in various directions within the bore of the bearings are a plurality of grooves, the purpose of which is to assure thorough lubrication of that portion of the cross-head pin journaled within the bearings.

Other objects and advantages of the invention will be apparent during the course of the following description.

In the accompanying drawings forming a part of this specification and in which like numerals are employed to designate like parts throughout the same, Figure 1, is a top view of a piston with its end removed showing my improved means attached thereto;

Fig. 2, is a longitudinal sectional view through the piston; and

Fig. 3, is a detail vertical sectional view of my improved lubricator.

In the drawings, wherein for the purpose of illustration, I have shown a preferred embodiment of my invention, the numeral 5 designates a piston of an internal combustion engine which is of tubular configuration with its upper end closed by the head 6 formed integrally therewith. The right is reserved that my invention is not to be restricted to use with this particular type of piston, as it may be equally as well used with various types of pistons.

Cast integral with the piston within the hollow portion thereof adjacent its upper end are two oppositely disposed bosses or lugs 7 each one of which is bored to receive the cross-head pin 8 which extends transversely across the interior of the piston. Mounted upon the cross-head pin intermediate its length is the connection rod 9 which joins the piston with the crank shaft of the engine. Extending outwardly from each side of the connecting rod at its point of connection with the cross-head pin are annular collars or sleeves 10 which form bushings between the connecting rod and the bosses 7. In this instance the connecting rod is rigidly joined with the cross-head pin, but in various forms of pistons the cross-head pin is stationary and the connecting rod is journaled thereon.

Referring more specifically to my invention, I provide each boss or bearing 7 with a tapering shaped upwardly extending reservoir 11 which is formed integral therewith. The upper or open end of the reservoir is covered by the downwardly inclined plates 12, the lowermost terminals of which are slightly spaced apart to form a slot for the passage of oil, as indicated by the numeral 13. The bottom of the reservoir is formed by the outer peripheral surface of the bearing 7 which is apertured to provide a passage 14 in vertical alinement with the slot 13. Branching from the aperture 14 in various directions within the bore of the bearing are grooves 15 which cover approximately one-half the circumference of the bearing. This permits the oil within the reservoir 11 to be freely distributed to all parts of the cross-head pin journaled within the bearing, thus assuring its proper lubrication.

As is a well known fact, the crank case of an internal combustion engine is always partially filled with oil, and consequently the crank shaft in its rotation through the oil will splash the lubricant into the hollow portion of the piston and upon contacting with the inner side of the head 6 will drip into the lubricant reservoir 11, being retained therein by the inclined plate 12. Thus it is obvious, that the cross-head pin will at all times be thoroughly lubricated while at the same time the hottest portion of the piston will be kept cool.

While it is shown here the lubricant reservoirs are attached to the bearing in which the cross-head pin is journaled, the reservoirs may be joined with the connecting rod when used in connection with pistons where the cross-head pin is rigidly mounted within the piston.

It is to be understood that the form of my invention herewith shown and described is to be taken as a preferred example of the same and that certain changes in the shape, size, and arrangement of parts may be resorted to without departing from the spirit of the invention or the scope of the subjoined claims.

Having thus fully described my invention, I claim:—

1. A lubricator for the wrist-pin of a piston comprising a lubricant reservoir, inclined walls covering said reservoir, and a passage through the bottom thereof.

2. A lubricator for the wrist-pin of a piston comprising a reservoir, walls covering said reservoir, and a passage through the cover and the bottom of the reservoir.

3. A lubricator for the wrist-pin of a piston comprising a tapering shaped reservoir, inclined walls covering said reservoir, said walls having their lower extremities spaced slightly to provide a slot, and a passage through the bottom of the reservoir.

4. The combination of a piston having oppositely disposed bosses to receive the cross-head pin passing through the connecting rod, a lubricant reservoir cast integral with the bosses, and a passage beneath the reservoir through the boss to feed oil to the cross-head pin.

5. In combination with a piston having oppositely disposed bosses, lubricant reservoirs cast integral therewith, inclined walls covering said reservoirs, and an opening through the bottom communicating with the bore of the bosses.

6. In combination with a piston having oppositely disposed bosses, tapering shaped reservoirs cast integral therewith, inclined walls covering said reservoirs, said walls having their terminals slightly spaced to form a slot, and an opening through the bottom communicating with the bore of the bosses.

7. In combination with a piston having oppositely disposed bosses, a cross-head pin journaled therein, lubricant reservoirs cast integral with the bosses, and openings through the bottom of the reservoir, grooves within the bore of the bosses branching from the said openings, and means retaining the lubricant within the reservoir.

In testimony whereof, I have affixed my signature in the presence of two witnesses.

HARRY O. BOYER.

Witnesses:
  J. L. STEVENS,
  H. G. SHUMWAY.